United States Patent [19]

Dubanchet

[11] Patent Number: 5,238,701

[45] Date of Patent: Aug. 24, 1993

[54] PROCESS FOR MAKING DELICATESSEN MEAT PRODUCTS AND PRODUCTS THEREOF

[75] Inventor: André Dubanchet, Ecully, France

[73] Assignee: Canada LTEE, Canada

[21] Appl. No.: 925,898

[22] Filed: Aug. 7, 1992

Related U.S. Application Data

[63] Continuation of Ser. No. 794,637, Nov. 18, 1991, abandoned, which is a continuation of Ser. No. 671,135, Mar. 18, 1991, abandoned, which is a continuation of Ser. No. 556,859, Jul. 24, 1990, abandoned, which is a continuation of Ser. No. 323,252, Mar. 9, 1989, abandoned, which is a continuation of Ser. No. 137,570, Dec. 24, 1987, abandoned.

[30] Foreign Application Priority Data

Dec. 13, 1986 [FR] France .................................. 86 18521

[51] Int. Cl.$^5$ .......................... A23L 1/314; A23L 1/317
[52] U.S. Cl. ....................................... 426/641; 426/646
[58] Field of Search ............... 426/601, 602, 603, 646, 426/652, 585, 304

[56] References Cited

U.S. PATENT DOCUMENTS

| | | | |
|---|---|---|---|
| 3,748,148 | 7/1973 | Tehle | 426/646 X |
| 3,982,039 | 9/1976 | Seibelli et al. | 426/603 |
| 4,228,190 | 10/1980 | Wallgren | 426/603 X |
| 4,504,515 | 3/1985 | Hohenester et al. | 426/646 X |
| 4,680,194 | 7/1987 | Kilroy | 426/603 X |

FOREIGN PATENT DOCUMENTS

938885  6/1982  U.S.S.R. ............................. 426/646

Primary Examiner—Arthur L. Corbin
Attorney, Agent, or Firm—Larson and Taylor

[57] ABSTRACT

A process for making delicatessen meat products using vegetable fats instead of the traditional animal fats. A predetermined amount of vegetable oil is first heated to a temperature of at least 100° C., and a homogeneous mixture is made by incorporating milk proteins into the hot oil. The milk proteins are in an amount less than the oil. Then, boiling water is added to the mixture, and the mixture is stirred to create a stabilizing emulsion. The resulting vegetable fat is used in delicatessen meat products in place of animal fat.

10 Claims, No Drawings

PROCESS FOR MAKING DELICATESSEN MEAT PRODUCTS AND PRODUCTS THEREOF

This application is a continuation of application Ser. No. 07/794,637 filed Nov. 18, 1991 which is a continuation of Ser. No. 07/671,135, filed Mar. 18, 1991 which is a continuation of Ser. No. 556,859 filed Jul. 24, 1990, which is a continuation of Ser. No. 323,252 filed Mar. 9, 1989 which is a continuation of Ser. No. 07/137,570 filed Dec. 24, 1987, all now abandoned.

FIELD OF THE INVENTION

This invention relates to a process for making delicatessen meat products.

BACKGROUND OF THE INVENTION

Delicatessen meat products are divided into three large groups:
- a first consisting of dry products and products to be cooked: dry sausage types, Auvergne sausage, Lyon sausage, salami, truffled saveloy, sausage to be cooked, Toulouse sausage, etc . . . ;
- a second group consisting of cold fabricated cooked products: frankfurt types, hot dogs, bologna, mortadella, meat roll, etc.;
- a third group consisting of hot fabricated cooked products: liver paste products, liver mousse, liverwurst, goose liver mousse, etc.

Cooked or dried hams, which are cooked muscles or muscles to be dried, will not be considered here as delicatessen meat products.

These delicatessen products ordinarily consist of a mixture of muscle, offal and animal fats. These animal fats consist either of pork fat or of beef or veal fat.

These known delicatessen meat products have the drawback of containing animal fats, which are products advised against by the medical profession. Avoiding the consumption of these animal fats actually tends to diminish the cholesterol level in the blood, cholesterol being the cause of certain cardiac diseases.

Besides animal fats, these delicatessen meat products often contain chemical products at times considered as harmful to health, such as polyphosphates.

SUMMARY OF THE INVENTION

This invention relates to a process for making delicatessen meat products without any incorporation of animals fats into these products. According to this process, liquid vegetable fats—soybean, palm, peanut, sunflower, olive oil, etc.—are used to replace these animal fats. To transform these vegetable fats from the liquid state to the solid state and stabilize them so there is no exudation during cooking or sterilizing, a predetermined amount of this vegetable oil is heated to a temperature above 100° C.; then a homogeneous mixture is made by incorporating into this hot oil, milk proteins in a predetermined amount which is less than the amount of oil; then into this mixture is incorporated an amount of boiling water at least equal to this amount of oil. The mixture thus constituted is stirred to create a stabilizing emulsion. The resulting vegetable fat is used to make the delicatessen meat product.

Depending on the case, either this stirring is performed until a hot vegetable fat paste is obtained, then this paste is allowed to cool to obtain a solid mass of vegetable fat which is then worked either by cutting it into small pieces or by finely chopping it to make the delicatessen meat product by the traditional method, or else, during stirring, offal or meat product is incorporated to make a delicatessen meat product of the third group.

DETAILED DESCRIPTION OF THE INVENTION

The invention will be well understood and its advantages and other characteristics will come out during the following description of an embodiment of the process applied to making delicatessen products of each of the three large groups defined above.

For making products of the first group (dry products and products to be cooked), the fat must be present in small pieces. Therefore a solid mass of fat must be constituted, firm enough for this vegetable fat to be able to be cut easily. According to the invention, the process is the following:
- a vegetable oil (soybean, palm, peanut, sunflower, olive oil . . .) is used at the start and heated to temperature above 100° C.;
- into this part of hot oil is incorporated an amount of solubilized milk proteins equal, for example, to a fifth of the hot oil part, thus achieving a homogeneous mixture;
- into this mixture is incorporated an amount of boiling water equal to or greater than the amount of oil;
- the latter mixture is made to go into a stirring machine, consisting, for example, of a turbomill which by emulsification makes it go from the liquid state to the pasty state;
- the resulting paste is cooled until a solid mass of vegetable fat is obtained.

This solid mass of vegetable fat is then cut into small pieces and worked in a traditional way like pork lard to make a delicatessen meat product, such as a dry sausage or mortadella, for example.

For making products of the second group (cold fabricated cooked products), a solid mass of vegetable fat is made in exactly the same way, but this vegetable fat is used to replace the pork lard, by mixing, in the traditional way, the meat and this finely chopped vegetable solid fat. The large pieces can consist of poultry meat, the animal fat content of which is very slight.

In this second group, because the fats are already stabilized, the polyphosphates, currently used for this purpose, can be eliminated without danger.

For making products of the third group (hot fabricated cooked products), the production technique differs slightly from the two preceding ones by the fact that the mass of solid vegetable fat is not previously prepared and then worked, but liver or other meat product is incorporated into the mixture during the stirring operation, this meat product then being stirred with the rest. By way of example, the procedure is as follows:
- there are incorporated five parts of oil heated to 100° C., one part of solubilized milk product and 5 to 10 parts of boiling water depending on the oiliness and creaminess it is desired to obtain,
- after production, thanks to a beginning of stirring, of the mass slightly lighter than the preceding one, there is incorporated into this mixture liver or any other meat product consisting of a muscle, and the stirring is continued to obtain the delicatessen meat product cooked and produced hot.

Of course, the invention is not limited to the embodiments of the process described above by way of examples; on the contrary it takes in all variant embodiments.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A delicatessen meat product selected from the group consisting of dry meat products, meat products to be cooked, cold fabricated cooked meat products and hot fabricated cooked meat products, said delicatessen meat product comprising animal meat in admixture with a vegetable fat product comprising a vegetable oil having incorporated therein milk proteins in a quantity less than that of said vegetable oil and water in an amount at least equal to the amount of said vegetable oil.

2. A delicatessen meat product according to claim 1, wherein said vegetable oil in said vegetable fat product is selected from the group consisting of soybean, palm, peanut, sunflower and olive oil.

3. A delicatessen meat product according to claim 1, wherein the amount of said milk proteins in said vegetable fat product corresponds to 1/5 of the amount of said vegetable oil.

4. A delicatessen meat product according to claim 1, wherein said vegetable fat product comprises 5 parts of vegetable oil, 1 part of milk protein and 5 to 10 parts of water.

5. A delicatessen meat product according to claim 1, wherein when the delicatessen meat product is selected from the group consisting of dry meat products and meat products to be cooked and cold fabricated cooked meat products, said vegetable fat product is in the form of a solid firm mass obtained by:
heating a predetermined amount of said vegetable oil to a temperature of at least 100° C.,
forming a homogenous mixture of the heated vegetable oil with milk proteins, said milk proteins being in a quantity less than that of said vegetable oil,
adding to said mixture boiling water in an amount at least equal to the amount of said vegetable oil,
stirring said mixture for a period of time sufficient to induce emulsification and convert said mixture from a liquid state to a pasty state; and
cooling the resulting paste until a solid firm mass of vegetable fat is obtained.

6. A delicatessen meat product according to claim 1, wherein when the delicatessen meat product is a hot fabricated cooked meat product, said vegetable fat product is, during the preparation of said delicatessen meat product, in the form of a liquid paste emulsion obtained by:
heating a predetermined amount of said vegetable oil to a temperature of at least 100° C.,
forming a homogenous mixture of the heated vegetable oil with milk proteins, said milk proteins being in a quantity less than that of said vegetable oil,
adding to said mixture boiling water in an amount at least equal to the amount of said vegetable oil, and then
stirring said mixture to create a stabilizing emulsion.

7. In a process for making delicatessen meat products selected from the group consisting of dry meat products, meat products to be cooked, cold fabricated cooked meat products and hot fabricated cooked products, wherein an animal fat additive is added to meat incorporated in said meat products, the improvement comprising replacing all of said animal fat additive with a vegetable fat product free of animal fat, said vegetable fat product comprising a vegetable oil having incorporated therein milk proteins in a quantity less than that of said vegetable oil and water in an amount at least equal to the amount of said vegetable oil.

8. A process according to claim 7, wherein said vegetable fat product is prepared by a process comprising:
heating a predetermined amount of said vegetable oil to a temperature of at least 100° C.
forming a homogenous mixture of the heated vegetable oil with milk proteins, said milk proteins being in a quantity less than that of said vegetable oil,
adding to said mixture boiling water in an amount at least equal to the amount of said vegetable oil, and then
stirring said mixture to create a stabilizing emulsion.

9. A process according to claim 7, wherein when the delicatessen meat products are selected from dry meat products, meat products to be cooked and cold fabricated cooked meat products, said process further comprises providing a solid firm mass of said vegetable fat product, chopping said solid firm mass of vegetable fat product and mixing said chopped vegetable fat product with meat to obtain the desired delicatessen meat product.

10. A process according to claim 8, wherein when the delicatessen meat product is a hot fabricated cooked meat product, said process further comprises providing a stabilizing liquid emulsion of said vegetable fat product, incorporating meat into said vegetable fat product, incorporating meat into said vegetable fat product and continuing the stirring of the resulting mixture to obtain the desired delicatessen meat product.

* * * * *

UNITED STATES PATENT AND TRADEMARK OFFICE
CERTIFICATE OF CORRECTION

PATENT NO. : 5,238,701
DATED : August 24, 1993
INVENTOR(S) : DUBANCHET

It is certified that error appears in the above—identified patent and that said Letters Patent is hereby corrected as shown below:

Title page Item [73], change the Assignee from "Canada LTEE, Canada" to --158630 Canada Ltee, Canada--.

Signed and Sealed this

Twenty-eight Day of February, 1995

Attest:

BRUCE LEHMAN

*Attesting Officer*          *Commissioner of Patents and Trademarks*